United States Patent
Sokolov et al.

(10) Patent No.: US 10,284,556 B1
(45) Date of Patent: May 7, 2019

(54) SYSTEMS AND METHODS FOR VERIFYING AUTHENTICATION REQUESTS USING INTERNET PROTOCOL ADDRESSES

(71) Applicant: Symantec Corporation, Mountain View, CA (US)

(72) Inventors: Ilya Sokolov, Boston, MA (US); Kevin Jiang, San Mateo, CA (US)

(73) Assignee: Symantec Corporation, Mountain View, CA (US)

(*) Notice: Subject to any disclaimer, the term of this patent is extended or adjusted under 35 U.S.C. 154(b) by 46 days.

(21) Appl. No.: 15/349,682

(22) Filed: Nov. 11, 2016

(51) Int. Cl.
*H04L 29/06* (2006.01)
*G06N 99/00* (2019.01)
*G06N 7/00* (2006.01)

(52) U.S. Cl.
CPC ......... *H04L 63/0876* (2013.01); *G06N 7/005* (2013.01); *G06N 99/005* (2013.01); *H04L 63/1441* (2013.01)

(58) Field of Classification Search
CPC . H04L 63/0876; H04L 63/1441; G06N 7/005; G06N 99/005
See application file for complete search history.

(56) References Cited

U.S. PATENT DOCUMENTS

| | | | | |
|---|---|---|---|---|
| 7,082,419 B1* | 7/2006 | Lightowler | ............ | G06N 3/063 706/15 |
| 8,762,298 B1* | 6/2014 | Ranjan | ..................... | G06N 5/02 706/12 |
| 9,262,642 B1* | 2/2016 | Roth | .................... | G06F 21/62 |
| 2008/0127323 A1* | 5/2008 | Soin | .................... | G06F 21/31 726/12 |
| 2013/0036342 A1* | 2/2013 | Deo | .................... | G06Q 30/02 715/202 |
| 2014/0165203 A1* | 6/2014 | Friedrichs | ............... | G06F 21/56 726/24 |
| 2014/0280702 A1* | 9/2014 | Barker | ............... | H04N 21/2402 709/217 |

(Continued)

OTHER PUBLICATIONS

Zhun Cai et al., "An Improved MyProxy System in Grid by Using Hardware Security Devices," 2006 IEEE Computer Society, pp. 1-8. (Year: 2006).*

(Continued)

*Primary Examiner* — Luu T Pham
*Assistant Examiner* — Canh Le
(74) *Attorney, Agent, or Firm* — FisherBroyles, LLP

(57) ABSTRACT

A computer-implemented method for verifying authentication requests using IP addresses may include (i) collecting, by a computing system, data on IP address changes from a set of endpoint devices, (ii) creating, by the computing system using the data on IP address changes, a virtual IP address distance map based on a likelihood of change from at least one origin IP address to at least one destination IP address, (iii) automatically detecting, by the computing system, a change in an IP address of a client device, (iv) determining, by the computing system and based on the virtual IP address distance map, that the change in the IP address of the client device indicates that an authentication request from the client device is suspicious, and (v) performing, by the computing system, a security action to secure the client device. Various other methods, systems, and computer-readable media are also disclosed.

20 Claims, 7 Drawing Sheets

(56) References Cited

U.S. PATENT DOCUMENTS

2016/0094551 A1* 3/2016 Sugihara ............. H04L 63/1466
726/7
2016/0150043 A1* 5/2016 Petronic .............. H04L 61/2546
709/220

OTHER PUBLICATIONS

Erik Guttman, "Service Location Protocol: Automatic Discovery of IP Network Services," IEEE Internet Computing, Jul.-Aug. 1999, pp. 71-80. (Year: 1999).*
Johann; The X-Forwarded-For HTTP header; http://johannburkard.de/blog/programming/java/x-forwarded-for-http-header.html; Dec. 2, 2008.

* cited by examiner

SYSTEMS AND METHODS FOR VERIFYING AUTHENTICATION REQUESTS USING INTERNET PROTOCOL ADDRESSES

Electronic authentication provides ways to verify a user or an endpoint device when attempting to access an online service. For example, passwords can help verify a user who is accessing a financial website with a mobile device. Unfortunately, credentials used to authenticate a user may be stolen or mismanaged, causing breaches to the online service. In some cases, a digital address, like an Internet Protocol (IP) address, may be used in conjunction with the user's credential to add a layer of security in verifying the user. IP addresses may provide a general physical location for the user, which may allow authentication programs to block attempts originating from IP addresses that are suspicious.

However, due to the use of various IP address mapping methods, such as network address translation (NAT), or technology that allows remote access of accounts from other devices, such as a virtual private network (VPN), IP addresses may not be reliable indicators of geographic location. For example, a mobile device that switches from a home network to a wireless carrier network may suddenly change IP addresses, which may then indicate a jump in physical location. A legitimate authentication request may be incorrectly blocked due to such forms of address mapping that result in suspicious IP addresses. In addition, an attacker in the same general physical location as a legitimate user, or using a proxy with the same IP address location, may be inadvertently allowed to use stolen credentials. Accordingly, the instant disclosure identifies and addresses a need for additional and improved systems and methods for verifying authentication requests using IP addresses.

SUMMARY

As will be described in greater detail below, the instant disclosure describes various systems and methods for verifying authentication requests using IP addresses. In one example, a computer-implemented method for verifying authentication requests using IP addresses may include (i) collecting, by a computing system, data on IP address changes from a set of endpoint devices, (ii) creating, by the computing system using the data on IP address changes, a virtual IP address distance map based on a likelihood of change from at least one origin IP address to at least one destination IP address, (iii) automatically detecting, by the computing system, a change in an IP address of a client device, (iv) determining, by the computing system and based on the virtual IP address distance map, that the change in the IP address of the client device indicates that an authentication request from the client device is suspicious, and (v) performing, by the computing system, a security action to secure the client device.

In some embodiments, the data on the IP address changes may include a device identifier. Additionally or alternatively, the data on the IP address changes may include a description of the origin IP address, a description of the destination IP address, and/or a timing of an IP address change.

In some examples, creating the virtual IP address distance map may include using a machine learning method to determine the likelihood of change from the origin IP address to the destination IP address. Additionally, creating the virtual IP address distance map may include adjusting the likelihood of change based on the timing of the IP address change for an endpoint device.

In one embodiment, automatically detecting the change in the IP address of the client device may include monitoring the IP address of the client device, receiving a client origin IP address, receiving a client destination IP address, and/or detecting a timing of the change in the IP address of the client device. In this embodiment, determining that the change in the IP address of the client device indicates that the authentication request is suspicious may include detecting a timing of the authentication request, correlating the timing of the authentication request with the change in the IP address of the client device, comparing the change in the IP address of the client device to the virtual IP address distance map, and/or determining that the likelihood of change from the client origin IP address to the client destination IP address is below a threshold. Furthermore, in this embodiment, correlating the timing of the authentication request with the change in the IP address of the client device may include identifying an old authentication request from the client origin IP address, determining that the authentication request is a new authentication request from the client destination IP address, and/or detecting a cookie for the old authentication request from the client destination IP address.

In one example, performing the security action may include rejecting the authentication request. Additionally or alternatively, performing the security action may include sending an authentication challenge to the client device and/or alerting an administrator about the change in the IP address of the client device.

In one embodiment, a system for implementing the above-described method may include (i) a collection module, stored in memory, that collects, by a computing system, data on IP address changes from a set of endpoint devices, (ii) a creation module, stored in memory, that creates, by the computing system using the data on IP address changes, a virtual IP address distance map based on a likelihood of change from at least one origin IP address to at least one destination IP address, (iii) a detection module, stored in memory, that automatically detects, by the computing system, a change in an IP address of a client device, (iv) a determination module, stored in memory, that determines, by the computing system and based on the virtual IP address distance map, that the change in the IP address of the client device indicates that an authentication request from the client device is suspicious, and (v) a performance module, stored in memory, that performs, by the computing system, a security action to secure the client device. In addition, the system may include at least one processor that executes the collection module, the creation module, the detection module, the determination module, and the performance module.

In some examples, the above-described method may be encoded as computer-readable instructions on a non-transitory computer-readable medium. For example, a computer-readable medium may include one or more computer-executable instructions that, when executed by at least one processor of a computing system, may cause the computing system to (i) collect data on IP address changes from a set of endpoint devices, (ii) create, using the data on IP address changes, a virtual IP address distance map based on a likelihood of change from at least one origin IP address to at least one destination IP address, (iii) automatically detect a change in an IP address of a client device, (iv) determine, based on the virtual IP address distance map, that the change in the IP address of the client device indicates that an authentication request from the client device is suspicious, and (v) perform a security action to secure the client device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
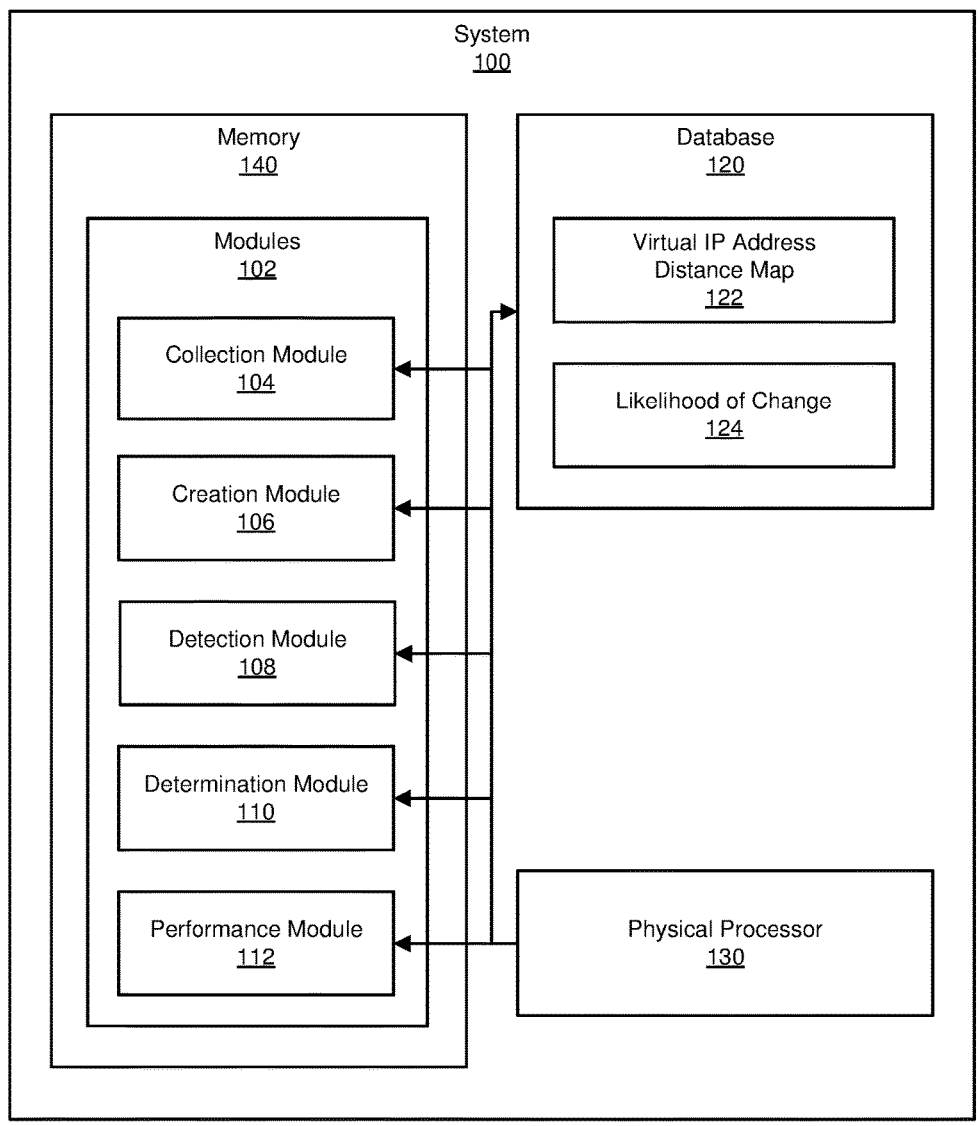
FIG. 1 is a block diagram of an example system for verifying authentication requests using IP addresses.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for verifying authentication requests using IP addresses. As will be explained in greater detail below, by creating a logical map of known and expected changes in IP addresses, the systems and methods described herein may more accurately detect a suspicious change in the IP address of a client device. For example, by using machine learning methods to evaluate a likelihood of change from one IP address to another IP address, the disclosed systems and methods may identify unlikely changes that are below an acceptable threshold. Furthermore, by correlating authentication requests with IP address changes in client devices, the disclosed systems and methods may detect potentially unauthorized authentication attempts in real time (e.g., without waiting for or requiring user input).

In addition, the systems and methods described herein may improve the functioning of a computing device by improving detection of suspicious authentication requests due to a change in an IP address and securing the computing device against resulting attacks. These systems and methods may also improve the field of electronic authentication and/or network security by requiring additional authentication measures to access online accounts such that the online accounts are more secure.

Figure 2:
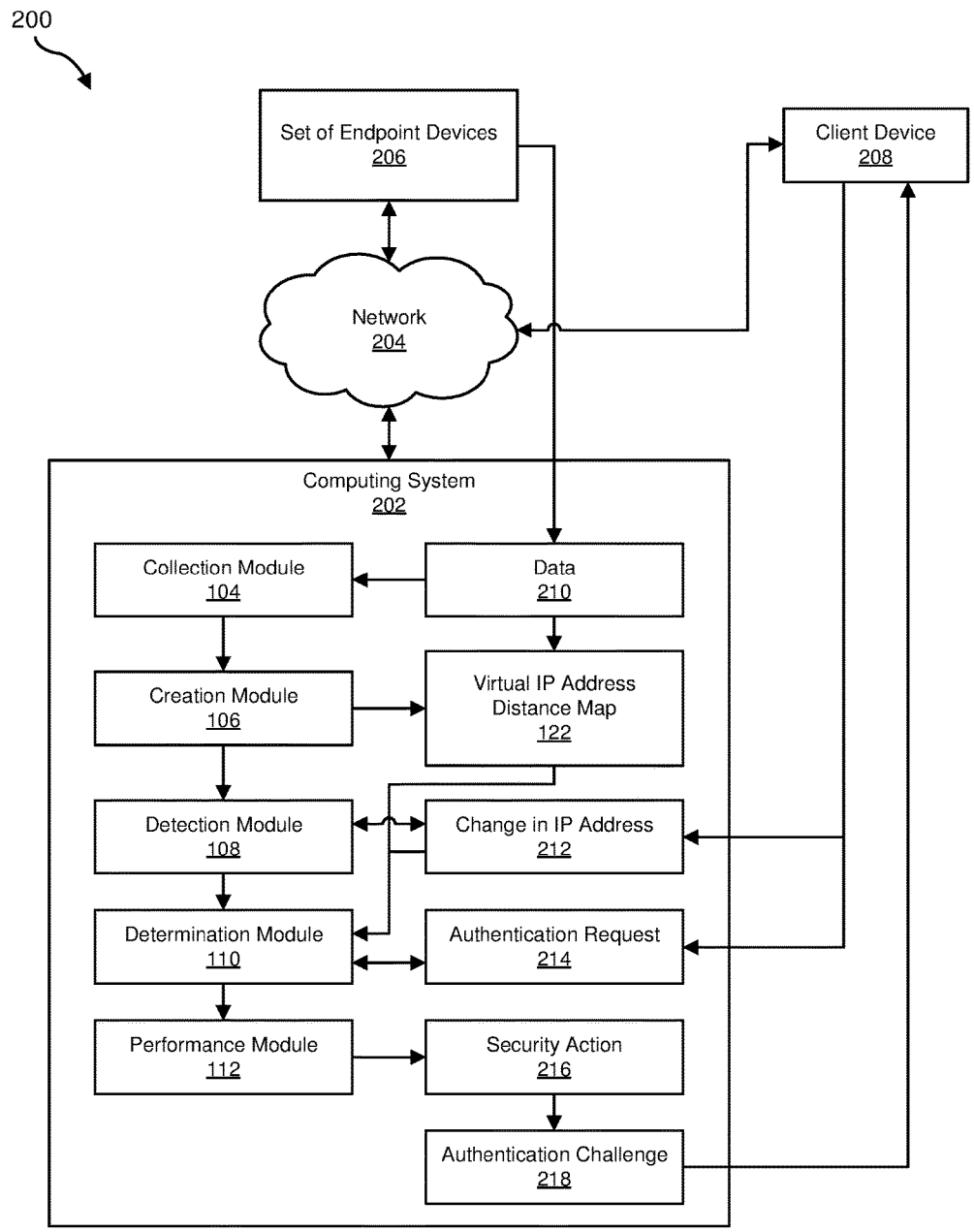
FIG. 2 is a block diagram of an additional example system for verifying authentication requests using IP addresses.

The following will provide, with reference to FIGS. 1 and 2, detailed descriptions of example systems for verifying authentication requests using IP addresses. Detailed descriptions of corresponding computer-implemented methods will also be provided in connection with FIG. 3. In addition, detailed descriptions of an example virtual IP address distance map created using example data on IP address changes will be provided in connection with FIG. 4. Furthermore, detailed descriptions of an example IP address change and associated authentication request will be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of example system 100 for verifying authentication requests using IP addresses. The term "IP address," as used herein, generally refers to a value or number that represents a device when communicating using the Internet Protocol across a network. In some examples, the IP address of a device may correspond with a physical location of the device and/or a logical subnetwork of the device. As used herein, the terms "subnetwork" and "subnet" generally refer to a division of a network, especially within the Internet, such as the logical division of IP addresses.

As illustrated in FIG. 1, example system 100 may include one or more modules 102 for performing one or more tasks. For example, and as will be explained in greater detail below, modules 102 may include a collection module 104 that collects, by a computing system, data on IP address changes from a set of endpoint devices. Modules 102 may additionally include a creation module 106 that creates, by the computing system using the data on IP address changes, a virtual IP address distance map 122 based on a likelihood of change 124 from at least one origin IP address to at least one destination IP address. The term "virtual IP address distance map," as used herein, generally refers to a logical mapping that describes a virtual distance between at least two IP addresses. The term "likelihood of change," as used herein, generally refers to a probability that a device may switch from one IP address, or an origin IP address, to another IP address, or a destination IP address. Likelihood of change 124 may also depend on the probability of change within a certain timeframe or other factors.

Modules 102 may further include a detection module 108 that automatically detects, by the computing system, a change in an IP address of a client device. Modules 102 may also include a determination module 110 that determines, by the computing system and based on virtual IP address distance map 122, that the change in the IP address of the client device indicates that an authentication request from the client device is suspicious. The term "authentication request," as used herein, generally refers to a digital request from a device to gain access to an account or service. An authentication request may include information about the account, a user making the request, a device making the request, a digital verification of a user or account, and/or other forms of identifying information.

Furthermore, modules 102 may include a performance module 112 that performs, by the computing system, a security action to secure the client device. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing system 202, set of endpoint devices 206, and/or client device 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate verifying authentication requests using IP addresses. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store virtual IP address distance map 122, which may include logical connections between IP addresses, and/or likelihood of change 124, which may include a probability of a device moving from an origin IP address to a destination IP address. Database 120 may represent portions of a single database or computing device or a plurality of databases or computing devices. For example, database 120 may represent a portion of computing system 202, set of endpoint devices 206, and/or client device 208 in FIG. 2. Alternatively, database 120 in FIG. 1 may represent one or more physically separate devices capable of being accessed by a computing device, such as computing system 202, set of endpoint devices 206, and/or client device 208 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing system 202 in communication with a set of endpoint devices 206 and a client device 208 via a network 204. In one example, all or a portion of the functionality of modules 102 may be performed by computing system 202, set of endpoint devices 206, client device 208, and/or any other suitable computing system or device. Similarly, devices within set of endpoint devices 206, client device 208, and/or computing system 202 may be merged into a single machine or computing system such that the functionality of each of modules 102 is provided within a single device.

As will be described in greater detail below, one or more of modules 102 from FIG. 1 may, when executed by at least one processor of computing system 202, set of endpoint devices 206, and/or client device 208 enable computing system 202, set of endpoint devices 206, and/or client device 208 to monitor authentication requests from client devices. For example, and as will be described in greater detail below, collection module 104 may collect, by computing system 202, data 210 on IP address changes from set of endpoint devices 206. Creation module 106 may create, by computing system 202 using data 210 on IP address changes, virtual IP address distance map 122 based on likelihood of change 124 from at least one origin IP address to at least one destination IP address. Detection module 108 may automatically detect, by computing system 202, a change in an IP address of client device 208, such as a change in IP address 212. Determination module 110 may determine, by computing system 202 and based on virtual IP address distance map 122, that change in IP address 212 of client device 208 indicates that an authentication request 214 from client device 208 is suspicious. Performance module 112 may perform, by computing system 202, a security action 216 to secure client device 208.

In the example of FIG. 2, and as will be explained in greater detail below, computing system 202 may first collect data 210 on IP address changes from set of endpoint devices 206 via network 204. Computing system 202 may then create virtual IP address distance map 122 using data 210. Next, computing system 202 may detect change in IP address 212 for client device 208 via network 204. Computing system 202 may also detect authentication request 214 from client device 208 via network 204. Computing system 202 may then determine that authentication request 214 is suspicious based on virtual IP address distance map 122 and change in IP address 212. Finally, computing system 202 may perform security action 216 by sending an authentication challenge 218 to client device 208 via network 204. The term "authentication challenge," as used herein, generally refers to an additional question or security measure that requires a valid response from a user or a device, such as client device 208. Examples of authentication challenges include, without limitation, a password request, a security question, a digital key, a shared secret, a cryptographic challenge, variations or combinations of one or more of the same, and/or any other suitable challenge.

Computing system 202, a device within set of endpoint devices 206, and/or client device 208 generally represent any type or form of computing device capable of reading computer-executable instructions. For example, computing system 202 may represent a server or a provider machine of an online service that runs security monitoring software. Set of endpoint devices 206 and/or client device 208 may represent endpoint devices that may be used to access online services or accounts. Although illustrated as separate entities in FIG. 2, client device 208 may be an endpoint device within set of endpoint devices 206. Additional examples of computing system 202, set of endpoint devices 206, and/or client device 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Network 204 generally represents any medium or architecture capable of facilitating communication or data transfer. In one example, network 204 may facilitate communication between computing system 202, set of endpoint devices 206, and client device 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
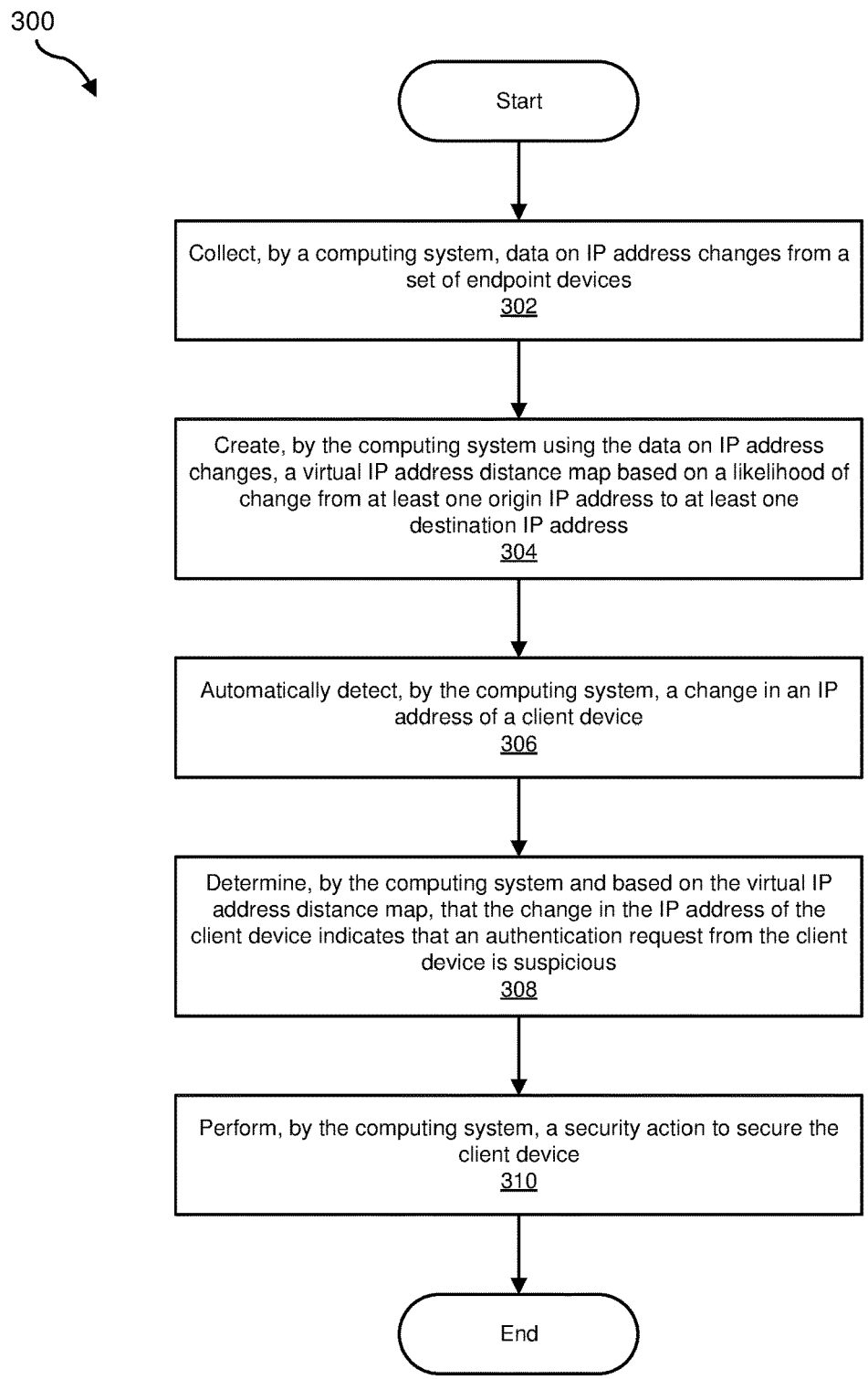
FIG. 3 is a flow diagram of an example method for verifying authentication requests using IP addresses.

FIG. 3 is a flow diagram of an example computer-implemented method 300 for verifying authentication requests using IP addresses. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may collect, by a computing system, data on IP address changes from a set of endpoint devices. For example, collection module 104 may, as part of computing system 202 in FIG. 2, collect data 210 on IP address changes from set of endpoint devices 206.

Collection module 104 may collect data 210 in a variety of ways. In some embodiments, data 210 on the IP address changes may include a device identifier, a description of the origin IP address, a description of the destination IP address, and/or a timing of an IP address change. For example, collection module 104 may receive, as part of data 210, identifying information from each device within set of endpoint devices 206. Collection module 104 may also receive information about all IP address changes, including an origin IP address and a destination IP address of each IP address change, for each device. The description of the origin IP address and/or the description of the destination IP address may include an exact IP address, a physical location associated with the IP address, and/or a subnet of the IP address. Furthermore, the timing of the IP address change may include information about the time of the IP address change and/or a speed of the IP address change from the origin IP address to the destination IP address. For example, the timing of the IP address change may include a timestamp indicating the last detected instance of the origin IP address and a second timestamp indicating the first detected instance of the destination IP address.

Figure 4:
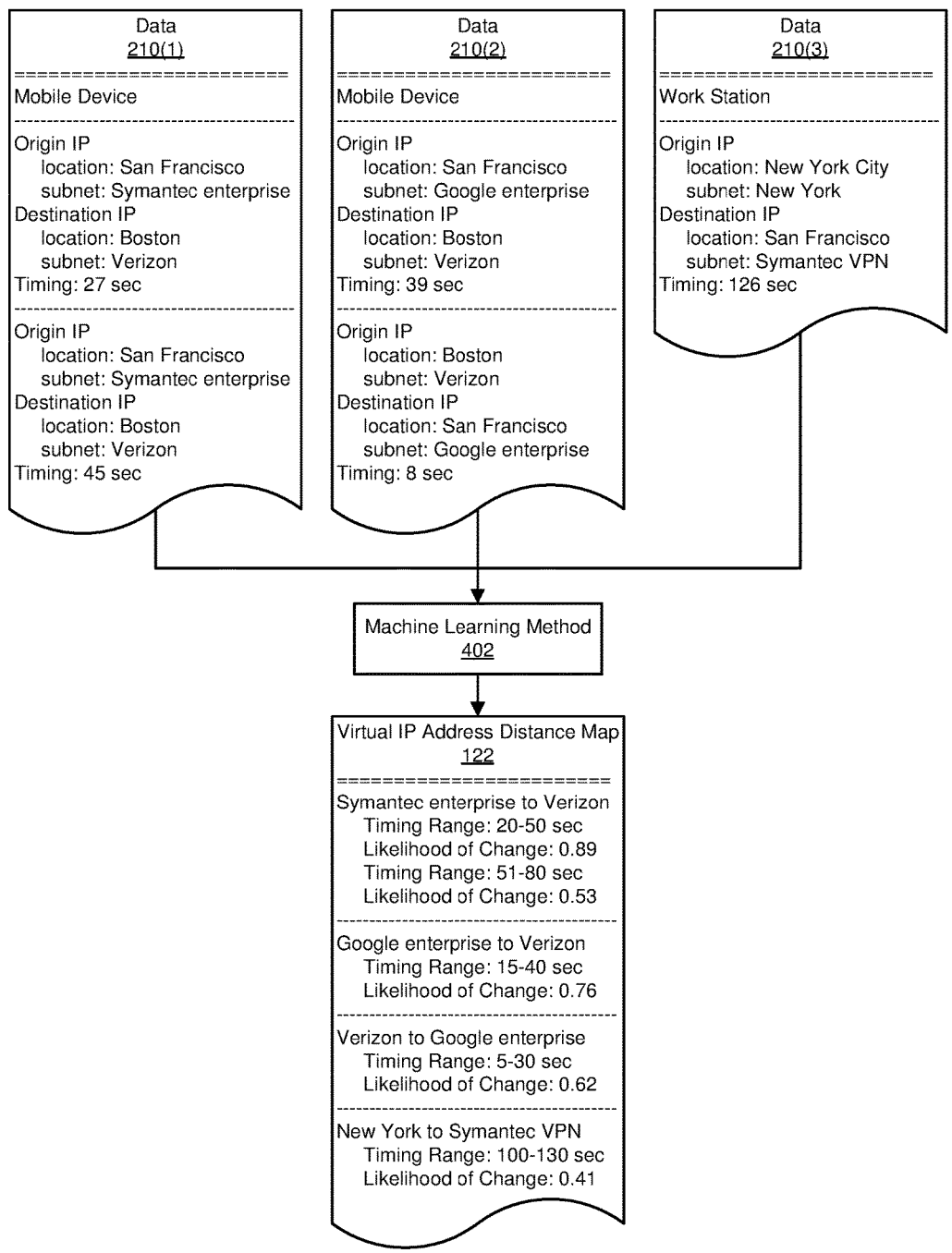
FIG. 4 is a block diagram of an example virtual IP address distance map created using example data on IP address changes.

As illustrated in FIG. 4, data 210(1) may include multiple IP address changes for a mobile device from an origin IP address (e.g., "SYMANTEC enterprise" subnet in "San Francisco") to a destination IP address (e.g., "VERIZON" subnet in "Boston") with different speeds of change (e.g., 27 and 45 seconds). In this example, a mobile device may be moving from a company network to a roaming mobile network. Data 210(2) may include IP address changes for a mobile device between two IP addresses (e.g., "GOOGLE enterprise" subnet in "San Francisco" and "VERIZON" subnet in "Boston") and the speed of change for each. In this example, a mobile device may be moving from a roaming mobile network to a company's building network and then out of the building network. Data 210(3) may include an IP address change for a work station between a local network (e.g., "New York" subnet in "New York City") and a VPN network (e.g., "SYMANTEC VPN" subnet in "San Francisco"). Collection module 104 may then collect all of data 210(1), data 210(2), and data 210(3) as part of data 210 in FIG. 2. Alternatively, collection module 104 may request data 210 from set of endpoint devices 206 and receive data 210 for each individual IP address change as it happens.

Returning to FIG. 3, at step 304, one or more of the systems described herein may create, by the computing system using the data on IP address changes, a virtual IP address distance map based on a likelihood of change from at least one origin IP address to at least one destination IP address. For example, creation module 106 may, as part of computing system 202 in FIG. 2, create, using data 210 on IP address changes, virtual IP address distance map 122 based on likelihood of change 124 from at least one origin IP address to at least one destination IP address.

Creation module 106 may create virtual IP address distance map 122 in a variety of ways. In some examples, creation module 106 may create virtual IP address distance map 122 by using a machine learning method to determine likelihood of change 124 from the origin IP address to the destination IP address and adjusting likelihood of change 124 based on the timing of the IP address change for an endpoint device. The phrase "machine learning method," as used herein, generally refers to a computational algorithm that may learn from data in order to make predictions. Examples of machine learning methods may include, without limitation, support vector machines, Bayesian networks, neural networks, clustering, decision trees, regression analysis, classification, variations or combinations of one or more of the same, and/or any other suitable supervised, semi-supervised, or unsupervised methods.

In the example of FIG. 4, creation module 106 uses a machine learning method 402 on data 210(1), data 210(2), and data 210(3) to create virtual IP address distance map 122 that indicates a likelihood of change within a timing range for each change in IP address subnet. In other examples, machine learning method 402 may use the timing of IP address changes in conjunction with the likelihood of change from a specific origin IP address or subnet to a specific destination IP address or subnet to determine overall likelihood of change 124. In alternate examples, machine learning method 402 may be used to determine a likelihood of the timing of a change in IP address, which may then determine likelihood of change 124.

Returning to FIG. 3, at step 306, one or more of the systems described herein may automatically detect, by the computing system, a change in an IP address of a client device. For example, detection module 108 may, as part of computing system 202 in FIG. 2, automatically detect change in IP address 212 of client device 208.

Detection module 108 may detect change in IP address 212 in a variety of ways. In one embodiment, detection module 108 may automatically detect change in IP address 212 of client device 208 by monitoring the IP address of client device 208, receiving a client origin IP address, receiving a client destination IP address, and/or detecting a timing of change in IP address 212 of client device 208. In this embodiment, detection module 108 may collect data on change in IP address 212 similar to data 210. In other embodiments, detection module 108 may collect additional or alternative data that indicates a change in the IP address of client device 208.

Figure 5:
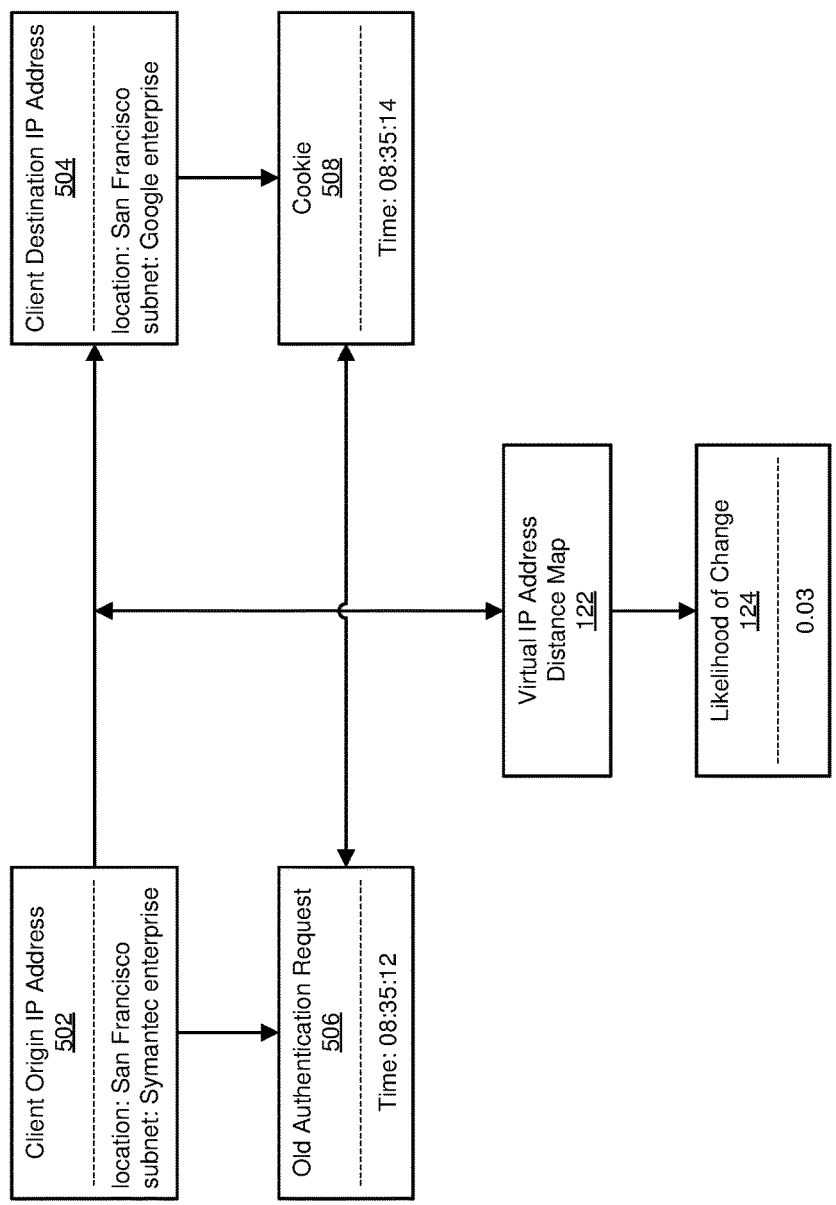
FIG. 5 is a block diagram of an example IP address change and associated authentication request.

As illustrated in FIG. 5, detection module 108 may detect change in IP address 212 by receiving a client origin IP address 502 and a client destination IP address 504. In this example, detection module 108 may detect a change from the subnet of client origin IP address 502 (e.g., "SYMANTEC enterprise") to the subnet of client destination IP address 504 (e.g., "GOOGLE enterprise"). The change between one enterprise subnet to a second enterprise subnet may be due to client device 208 physically changing locations or moving to a different network within range. In other examples, the change may be an unexpected change in IP address and may indicate suspicious activity.

Returning to FIG. 3, at step 308, one or more of the systems described herein may determine, by the computing system and based on the virtual IP address distance map, that the change in the IP address of the client device indicates that an authentication request from the client device is suspicious. For example, determination module 110 may, as part of computing system 202 in FIG. 2, determine, based on virtual IP address distance map 122, that change in IP address 212 of client device 208 indicates that authentication request 214 from client device 208 is suspicious.

Determination module 110 may determine that authentication request 214 is suspicious in a variety of ways. In some examples, determination module 110 may determine that change in IP address 212 of client device 208 indicates that authentication request 214 is suspicious by detecting a timing of authentication request 214, correlating the timing of authentication request 214 with change in IP address 212 of client device 208, comparing change in IP address 212 of client device 208 to virtual IP address distance map 122, and/or determining that the likelihood of change from the client origin IP address to the client destination IP address is below a threshold. In these examples, the threshold may include an acceptable degree of likelihood that change in IP address 212 is not suspicious. In one embodiment, the threshold may be manually set based on a predetermined value. In another embodiment, the threshold may be automatically set based on likelihood of changes in IP addresses in virtual IP address distance map 122.

In the above examples, correlating the timing of authentication request 214 with change in IP address 212 of client device 208 may include identifying an old authentication request from the client origin IP address, determining that authentication request 214 is a new authentication request from the client destination IP address, and/or detecting a cookie for the old authentication request from the client destination IP address. The term "cookie," as used herein, generally refers to digital data that stores information about a state of a software program or a user's online activity.

In the example of FIG. 5, determination module 110 may identify an old authentication request 506 from client origin IP address 502 and a cookie 508 for old authentication request 506 from client destination IP address 504 and may correlate them based on detected times of old authentication request 506 and cookie 508. In this example, cookie 508 may represent authentication request 214 or a part of authentication request 214. Determination module 110 may then compare change in IP address 212 from client origin IP address 502 to client destination IP address 504 with virtual IP address distance map 122. Based on the comparison, determination module 110 may calculate likelihood of change 124 for change in IP address 212 and may determine that likelihood of change 124 is below an acceptable threshold, therefore determining that cookie 508 is suspicious.

In the above example, although client origin IP address 502 and client destination IP address 504 have the same physical location (e.g., "San Francisco"), likelihood of change 124 from client origin IP address 502 to client destination IP address 504 may be low in virtual IP address distance map 122 due to the rarity of change from one subnet to the other and/or the timing of the change. For example, a device moving from a SYMANTEC enterprise subnet to a GOOGLE enterprise subnet may be unlikely, or a change may be possible but happen too quickly (e.g., too fast to physically move from one subnet to another), resulting in a low likelihood of change 124. Authentication requests associated with such a change in IP address may be similarly unlikely. Thus, determination module 110 may determine that authentication request 214 is suspicious after change in IP address 212 for client device 208.

Returning to FIG. 3, at step 310, one or more of the systems described herein may perform, by the computing system, a security action to secure the client device. For example, performance module 112 may, as part of computing system 202 in FIG. 2, perform security action 216 to secure client device 208.

Performance module 112 may perform security action 216 in a variety of ways. In one embodiment, performance module 112 may perform security action 216 by rejecting authentication request 214. In the example of FIG. 2, performance module 112 may perform security action 216 by sending authentication challenge 218 to client device 208. For example, performance module 112 may require an additional password or an answer to a security question from client device 208 before allowing authentication request 214. In the example of FIG. 5, performance module 112 may reject cookie 508 and request reauthentication. In other embodiments, performance module 112 may alert an administrator about change in IP address 212 of client device 208.

As explained above in connection with method 300 in FIG. 3, the disclosed systems and methods may, by crowdsourcing data from various endpoint machines to determine virtual connections between IP addresses, improve verification of authentication requests using information from IP addresses. Specifically, the disclosed systems and methods may use the virtual connections between IP addresses, such as IP address subnets, to train a machine learning method to create a virtual IP address distance map. By comparing changes in IP addresses of client devices to the virtual IP address distance map, the systems and methods described herein may then detect unusual IP address changes for a client device.

By correlating each authentication request with the IP address of the requesting client device, the disclosed systems and methods may then determine if an IP address change indicates a potentially suspicious authentication request. The systems and methods described herein may also identify suspicious IP address changes due to the speed or timing of the changes. Additionally, the systems and methods described herein may reject such suspicious authentication requests, further verify the authentication requests, or otherwise protect the client device or host computing systems from unauthorized access due to breaches such as password theft or redirected credentials.

As detailed above, by collecting known behaviors of changes in IP addresses of client devices, the disclosed systems and methods may more easily detect unusual or suspicious IP address changes. In addition, by correlating authentication requests with IP addresses, the disclosed systems and methods may provide additional verification of the authentication requests. Furthermore, by using logical connections of IP addresses instead of physical location, the disclosed systems and methods may overcome issues associated with IP address mapping and remote connections. Thus, the systems and methods described herein may improve the security of online authentication.

Figure 6:
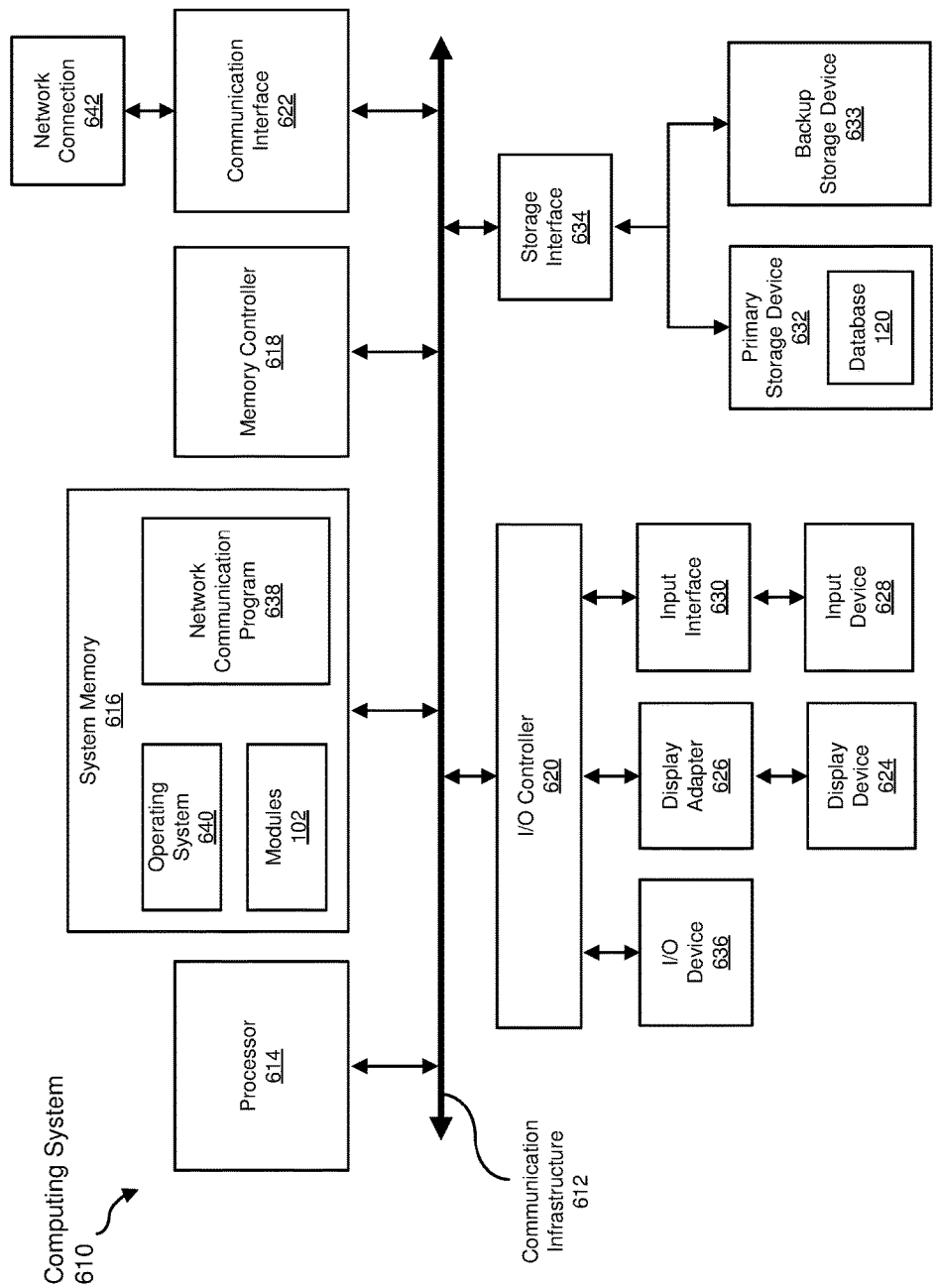
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application-Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an ASIC adapted to implement one or more of the example embodiments disclosed herein.

Figure 7:
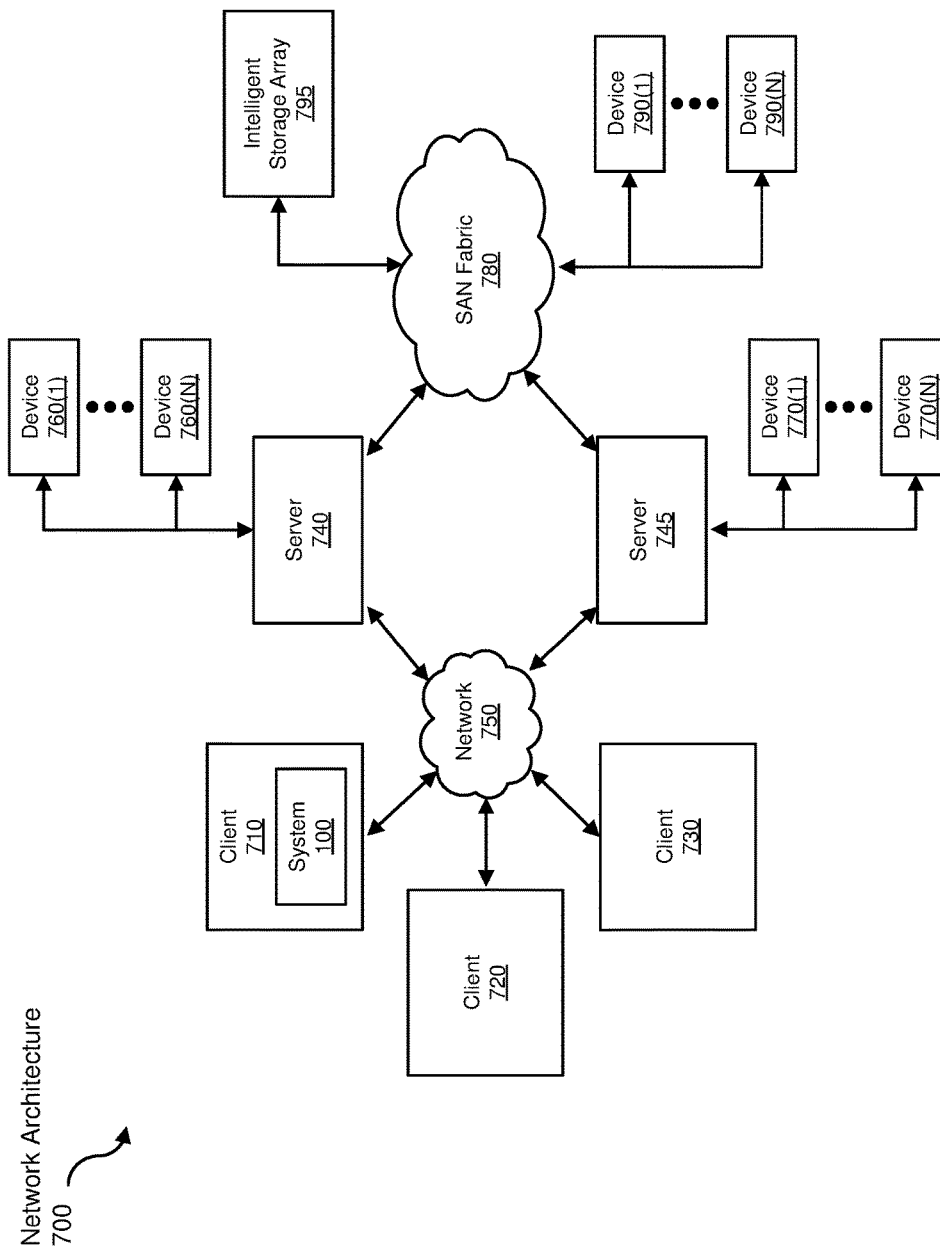
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for verifying authentication requests using IP addresses.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data on IP address changes to be transformed, transform the data on IP address changes, output a result of the transformation to a storage or output device, use the result of the transformation to create a virtual IP address distance map, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for verifying authentication requests using IP addresses, at least a portion of the method being performed by a computing system comprising at least one processor, the method comprising:
   collecting, by the computing system, data on IP address changes from a set of endpoint devices;
   creating, by the computing system using a machine learning method on the data on IP address changes, a virtual IP address distance map based on a likelihood of change from at least one origin IP address to at least one destination IP address and a timing of the change from the at least one origin IP address to the at least one destination IP address, wherein the virtual IP address distance map comprises logical connections that represent virtual distances between IP addresses instead of physical locations;
   automatically detecting, by the computing system, a change in an IP address of a client device;
   determining, by the computing system and based on the virtual IP address distance map, that the change in the IP address of the client device indicates that an authentication request from the client device to gain access to an online account is suspicious by:
      detecting a timing of the authentication request; and
      correlating the timing of the authentication request with the change in the IP address of the client device; and
   performing, by the computing system, a security action by rejecting the suspicious authentication request to secure the client device and the online account against attacks resulting from the suspicious authentication request.

2. The method of claim 1, wherein the data on the IP address changes comprises at least one of:
a description of the origin IP address;
a description of the destination IP address; and
a timing of an IP address change.

3. The method of claim 2, wherein creating the virtual IP address distance map comprises:
using the machine learning method to determine the likelihood of change from the origin IP address to the destination IP address; and
adjusting the likelihood of change based on the timing of the IP address change for an endpoint device.

4. The method of claim 1, wherein automatically detecting the change in the IP address of the client device comprises at least one of:
monitoring the IP address of the client device;
receiving a client origin IP address;
receiving a client destination IP address; and
detecting a timing of the change in the IP address of the client device.

5. The method of claim 4, wherein determining that the change in the IP address of the client device indicates that the authentication request is suspicious comprises at least one of:
comparing the change in the IP address of the client device to the virtual IP address distance map; and
determining that the likelihood of change from the client origin IP address to the client destination IP address is below a threshold.

6. The method of claim 4, wherein correlating the timing of the authentication request with the change in the IP address of the client device comprises at least one of:
identifying an old authentication request from the client origin IP address;
determining that the authentication request is a new authentication request from the client destination IP address; and
detecting a cookie for the old authentication request from the client destination IP address.

7. The method of claim 1, wherein performing the security action comprises at least one of:
sending an authentication challenge to the client device; and
alerting an administrator about the change in the IP address of the client device.

8. A system for verifying authentication requests using IP addresses, the system comprising:
a collection module, stored in memory, that collects, by a computing system, data on IP address changes from a set of endpoint devices;
a creation module, stored in memory, that creates, by the computing system using a machine learning method on the data on IP address changes, a virtual IP address distance map based on a likelihood of change from at least one origin IP address to at least one destination IP address and a timing of the change from the at least one origin IP address to the at least one destination IP address, wherein the virtual IP address distance map comprises logical connections that represent virtual distances between IP addresses instead of physical locations;
a detection module, stored in memory, that automatically detects, by the computing system, a change in an IP address of a client device;
a determination module, stored in memory, that determines, by the computing system and based on the virtual IP address distance map, that the change in the IP address of the client device indicates that an authentication request from the client device to gain access to an online account is suspicious by:
detecting a timing of the authentication request; and
correlating the timing of the authentication request with the change in the IP address of the client device;
a performance module, stored in memory, that performs, by the computing system, a security action by rejecting the suspicious authentication request to secure the client device and the online account against attacks resulting from the suspicious authentication request; and
at least one processor that executes the collection module, the creation module, the detection module, the determination module, and the performance module.

9. The system of claim 8, wherein the data on the IP address changes comprises at least one of:
a description of the origin IP address;
a description of the destination IP address; and
a timing of an IP address change.

10. The system of claim 9, wherein the creation module creates the virtual IP address distance map by:
using the machine learning method to determine the likelihood of change from the origin IP address to the destination IP address; and
adjusting the likelihood of change based on the timing of the IP address change for an endpoint device.

11. The system of claim 8, wherein the detection module automatically detects the change in the IP address of the client device by at least one of:
monitoring the IP address of the client device;
receiving a client origin IP address;
receiving a client destination IP address; and
detecting a timing of the change in the IP address of the client device.

12. The system of claim 11, wherein the determination module determines that the change in the IP address of the client device indicates that the authentication request is suspicious by at least one of:
comparing the change in the IP address of the client device to the virtual IP address distance map; and
determining that the likelihood of change from the client origin IP address to the client destination IP address is below a threshold.

13. The system of claim 11, wherein correlating the timing of the authentication request with the change in the IP address of the client device comprises at least one of:
identifying an old authentication request from the client origin IP address;
determining that the authentication request is a new authentication request from the client destination IP address; and
detecting a cookie for the old authentication request from the client destination IP address.

14. The system of claim 8, wherein the performance module performs the security action by at least one of:
sending an authentication challenge to the client device; and
alerting an administrator about the change in the IP address of the client device.

15. A non-transitory computer-readable medium comprising one or more computer-executable instructions that, when executed by at least one processor of a computing system, cause the computing system to:
collect, by the computing system, data on IP address changes from a set of endpoint devices;

create, by the computing system using a machine learning method on the data on IP address changes, a virtual IP address distance map based on a likelihood of change from at least one origin IP address to at least one destination IP address and a timing of the change from the at least one origin IP address to the at least one destination IP address, wherein the virtual IP address distance map comprises logical connections that represent virtual distances between IP addresses instead of physical locations;

automatically detect, by the computing system, a change in an IP address of a client device;

determine, by the computing system and based on the virtual IP address distance map, that the change in the IP address of the client device indicates that an authentication request from the client device to gain access to an online account is suspicious by:
  detecting a timing of the authentication request; and
  correlating the timing of the authentication request with the change in the IP address of the client device; and perform, by the computing system, a security action by rejecting the suspicious authentication request to secure the client device and the online account against attacks resulting from the suspicious authentication request.

16. The non-transitory computer-readable medium of claim 15, wherein the data on the IP address changes comprises at least one of:
  a description of the origin IP address;
  a description of the destination IP address; and
  a timing of an IP address change.

17. The non-transitory computer-readable medium of claim 16, wherein the computer-executable instructions cause the computing system to create the virtual IP address distance map by:
  using the machine learning method to determine the likelihood of change from the origin IP address to the destination IP address; and
  adjusting the likelihood of change based on the timing of the IP address change for an endpoint device.

18. The non-transitory computer-readable medium of claim 15, wherein the computer-executable instructions cause the computing system to automatically detect the change in the IP address of the client device by at least one of:
  monitoring the IP address of the client device;
  receiving a client origin IP address;
  receiving a client destination IP address; and
  detecting a timing of the change in the IP address of the client device.

19. The non-transitory computer-readable medium of claim 18, wherein the computer-executable instructions cause the computing system to determine that the change in the IP address of the client device indicates that the authentication request is suspicious by at least one of:
  comparing the change in the IP address of the client device to the virtual IP address distance map; and
  determining that the likelihood of change from the client origin IP address to the client destination IP address is below a threshold.

20. The non-transitory computer-readable medium of claim 18, wherein correlating the timing of the authentication request with the change in the IP address of the client device comprises at least one of:
  identifying an old authentication request from the client origin IP address;
  determining that the authentication request is a new authentication request from the client destination IP address; and
  detecting a cookie for the old authentication request from the client destination IP address.

* * * * *